J. W. McNAIRY.
FLOW METER.
APPLICATION FILED OCT. 4, 1919.

1,373,899

Patented Apr. 5, 1921
2 SHEETS—SHEET 1.

Inventor:
Jacob W. McNairy,
by
His Attorney.

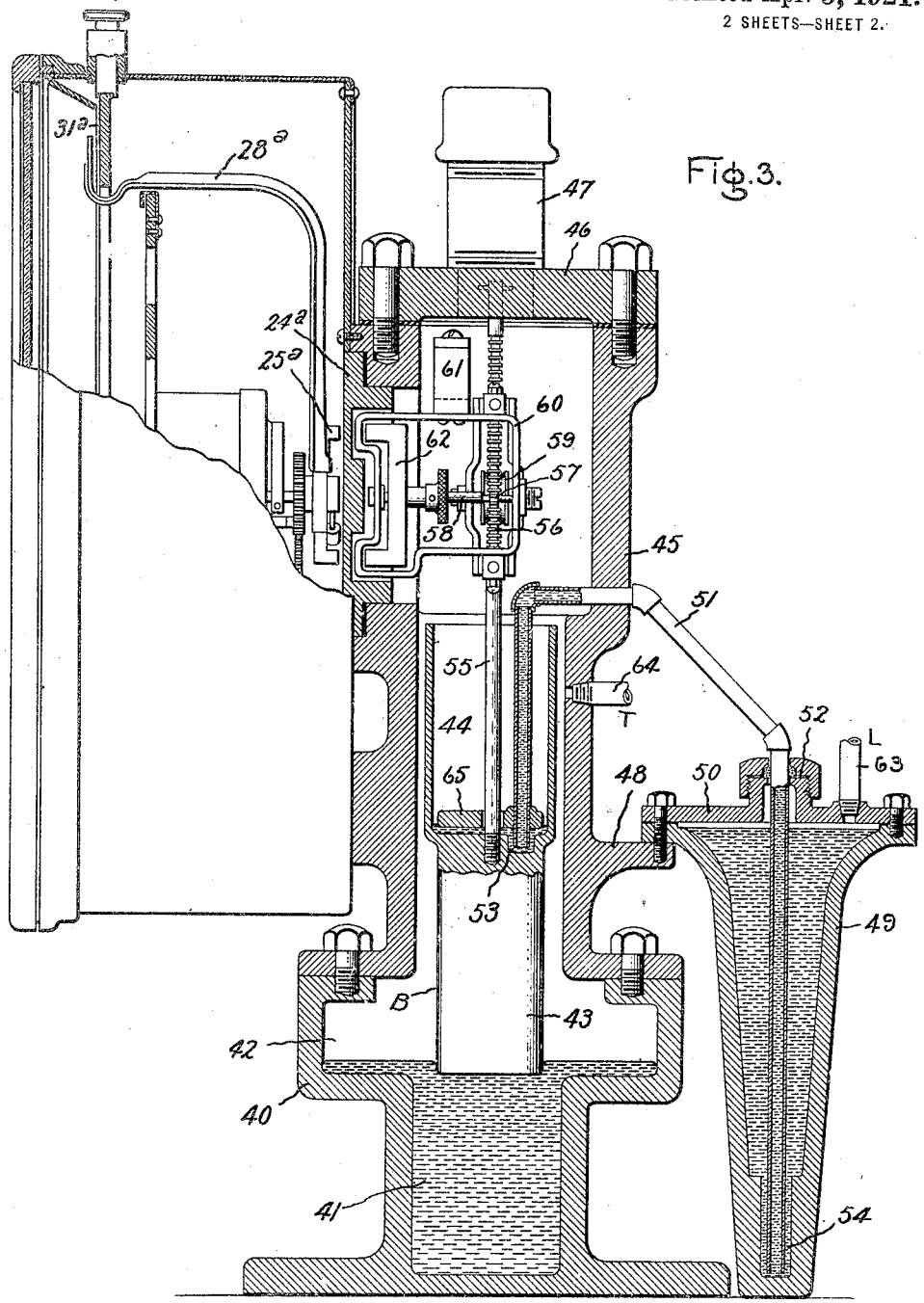

UNITED STATES PATENT OFFICE.

JACOB W. McNAIRY, OF LYNN, MASSACHUSETTS, ASSIGNOR TO GENERAL ELECTRIC COMPANY, A CORPORATION OF NEW YORK.

FLOW-METER.

1,373,899.     Specification of Letters Patent.     Patented Apr. 5, 1921.

Application filed October 4, 1919. Serial No. 328,443.

*To all whom it may concern:*

Be it known that I, JACOB W. MCNAIRY, a citizen of the United States, residing at Lynn, in the county of Essex, State of Massachusetts, have invented certain new and useful Improvements in Flow-Meters, of which the following is a specification.

The present invention relates to flow meters such as are used to indicate or indicate and record the flow of fluids through conduits, and particularly to such flow meters which comprise a pressure difference creating device located in the conduit through which the fluid to be measured flows and creates a pressure difference which bears a definite relation to the rate of flow, and a differential pressure instrument to which the pressure difference creating device is connected and which indicates or indicates and records such pressure difference.

The object of my present invention is to provide an improved flow meter of the character referred to, and for a consideration of what I believe to be novel and my invention, attention is directed to the accompanying description and the claims appended thereto.

Figure 1:
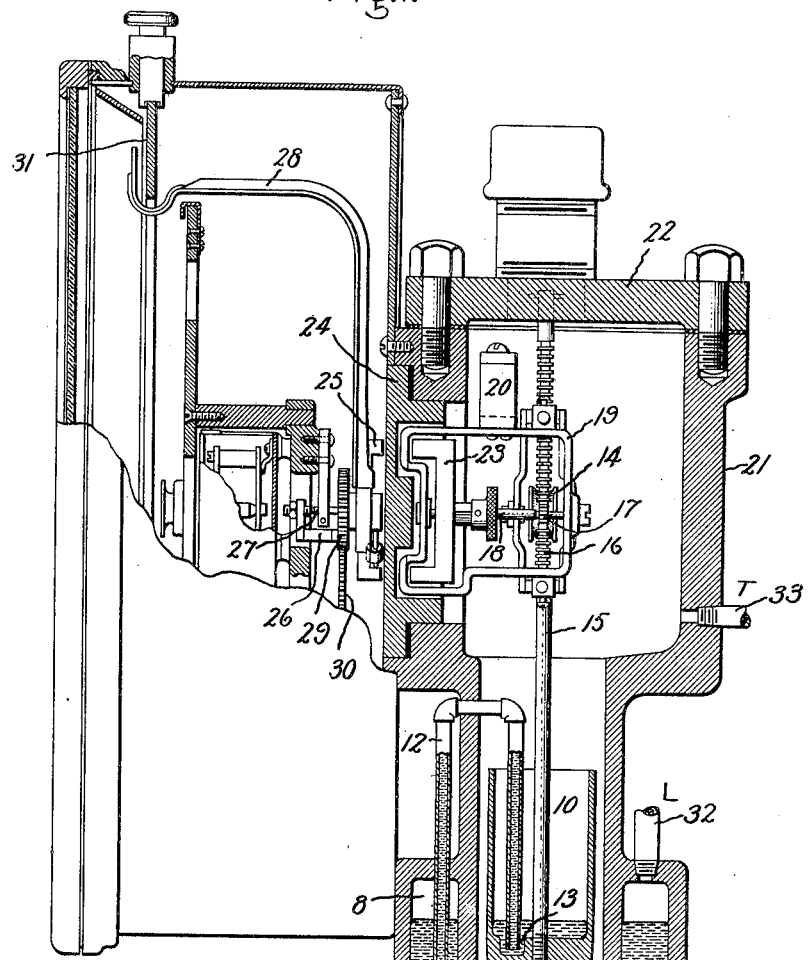
Figure 2:
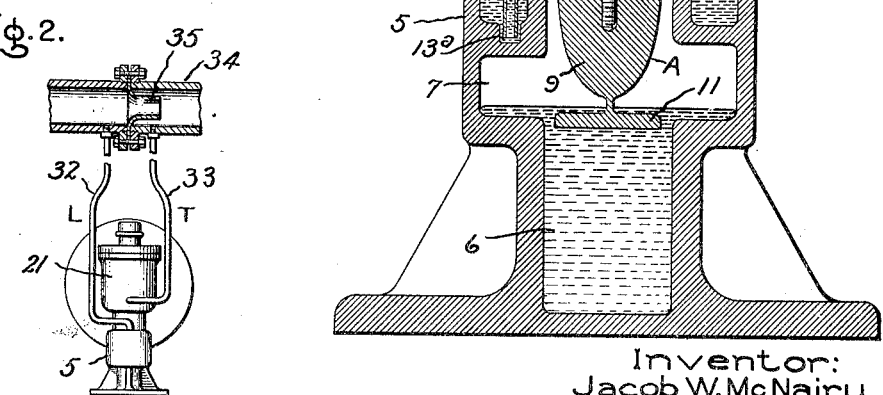

In the drawing, Figure 1 is a side view partly in section and partly in elevation of a metering instrument embodying my invention; Fig. 2 is a diagrammatic view showing the instrument of Fig. 1 connected to a pressure difference creating device; and Fig. 3 is a view similar to Fig. 1 of a modification.

Referring to the drawing, 5 indicates a base containing a lower well or float well 6 the upper end of which merges into a chamber 7 of greater diameter than well 6, and an upper annular chamber or well 8. In well 6 is a quantity of liquid, such as mercury, on which rides a float A comprising a displacing piston 9, a cup 10, and a supporting portion 11. In cup 10 and in well 8 are quantities of liquid, such as mercury, and connecting the cup and well is an inverted U-shaped tube 12 the ends of which extend down to the bottoms of the cup and well, terminating in recesses 13 and 13ª which serve to seal such ends, and in the case of well 8 prevent breaking of the liquid column in tube 12 in case of over deflection. Tube 12 is filled with liquid of the same character as that in well 8 and cup 10.

Connected to float A is a rod 15 on the upper end of which is a rack 16 which engages a pinion 17 carried on a shaft 18. Rack 16 is held in mesh with pinion 17 by a guide pulley 14. Shaft 18 is journaled in a frame 19 supported by a bracket 20 fastened to the upper part 21 of the instrument casing which upper part may be formed integral with the base. The upper part 21 of the casing is closed by a cover plate 22. On shaft 18 is a U-shaped bar magnet 23, the poles of which face an insert 24 of non-magnetic material in casing part 21. On the outside of insert 24 is a second bar magnet 25 the poles of which face the poles of magnet 23. Magnet 25 is carried by a frame 26 which is pivoted on a stationary shaft 27 and carried by frame 26 is an indicating pointer 28 and a gear wheel 29 which meshes with a gear segment 30 for operating a suitable recording and integrating mechanism. As is well understood, magnet 25 will follow the angular movements of magnet 23, and the angular movements of magnet 25 will be duly indicated by pointer 28 which moves over a scale plate 31, and recorded and integrated by the mechanism operated by segment 30. The magnetic transmission and the indicating and recording mechanism illustrated is of known structure and may be taken as typical of any suitable means for indicating or indicating and recording movements of float A. Its specific structure forms no part of the present invention and further description is considered unnecessary.

Connected to well 8 is the leading pressure pipe 32 and connected to casing part 21 is the trailing pressure pipe 33. The liquid in well 8 is thus subjected to the leading pressure and the liquid in cup 10 to the trailing pressure. Pipes 32 and 33 connect to the leading and trailing points of a pressure difference creating device. In Fig. 2, 34 indicates a conduit through which a fluid to be metered flows and in such conduit is a flow tube 35 which serves to create the pressure difference. Pipe 32 is connected to conduit 34 on the upstream side of the flow tube and pipe 33 is connected to it on the down stream side.

When the leading and trailing pressures are the same, which means that there is no flow, the levels of the liquids in well 8 and cup 10, will be the same and the indicating pointer 28 will stand at zero. The supporting portion 11 of float A will be submerged in the liquid in well 6 and the displacing piston 9 will rest on top of it. The supporting portion 11 is of such size as to just balance the weight of the float and the parts carried thereby and so maintain the pointer at zero position when there is no flow. If no flow takes place in conduit 34, a pressure difference will be set up which will be transmitted through pipes 32 and 33 to well 8 and cup 10. As a result, liquid from well 8 will be forced through tube 12 into cup 10 thus adding weight to float A with the result that it will begin to sink into the liquid in well 6. As float A lowers the liquid in cup 10 moves bodily with the float so that the level at which it stands lowers relatively to the level in well 8 which, therefore, causes more liquid to flow from well 8 to cup 10, which causes a still further lowering of cup 10. Of course in operation the flow of liquid from well 8 to cup 10 due to the pressure difference and that due to the lowering of the float takes place simultaneously, and, as will appear more clearly hereinafter, the arrangement will be such that the level of liquid in cup 10 is always higher than that in well 8. Eventually, however, a point is reached at which the increased buoyancy of the float due to its riding lower in the liquid in well 6 will balance the added weight of liquid in cup 10 and a difference in level will be established between the liquids in well 8 and cup 10 equal to the pressure difference. Equilibrium will then be established. Changes in rate of flow will now cause liquid to be transferred from well 8 to cup 10 or from cup 10 to well 8 depending on whether the flow increases or decreases and such transfer will be in amounts proportionate to the changes in the rate of flow. For any rate of flow there will be a definite position of float A at which the buoyancy of the float balances the weight of liquid in the cup. Movement of float A moves rod 15 and rack 16 thus turning pinion 17, shaft 18 and magnet 23. Magnet 25 follows the movements of magnet 23 and directly actuates the indicating and recording mechanism as is well understood.

With the above described arrangement it will be evident that other conditions remaining constant, the amount of movement of float A for a given pressure difference depends upon the relative areas of cup 10 and well 8, and that by varying their relative areas a large variation in the float movement may be obtained for the same pressure difference. Theoretically, the limit of deflection or the point of unstability would be reached when the area of well 8 divided by the area of cup 10 has a value such that the liquid level in cup 10 moves downward due to downward movement of float A as fast as the liquid level in well 8 lowers due to the pressure difference. Under these circumstances float A would immediately sink to the bottom of well 6 upon the first small deflection. For all values of well area 8 divided by cup area 10 less than the above, there will be a point at which for any pressure difference float A will eventually balance the pressure head between the liquids in well 8 and cup 10. In actual practice, therefore, knowing the total pressure difference to be dealt with, I choose such areas for well 8 and cup 10 as will give a practical deflection for the use intended. In any event I can obtain a large movement of the float A for a given pressure difference which lends great accuracy to the instrument.

For the conditions ordinarily met with in actual practice, I preferably make the relative areas of well 8 and cup 10 such that the level of liquid in cup 10 always remains the same. That is to say the areas are such that the level of liquid rises in cup 10 at the same rate as that at which the cup lowers. With such arrangement the difference in level between the liquids in well 8 and cup 10 due to a pressure difference will be established entirely by the lowering of the liquid in well 8. In other words, all the deflection occurs in well 8.

As is well known, a pressure difference creating device, such as that shown in Fig. 2, does not create a pressure difference which is a straight line function of the rate of flow, and if a uniform scale instrument is to be obtained some means must be provided to take account of this. This can be done by properly shaping either well 6, well 8, cup 10 or the float A as will be readily appreciated. In the present instance, I have shown float A as being so shaped that its buoyancy increases at a greater rate than the rate at which it is submerged and in such manner that equal vertical movements of float A represent equal changes in the rate of flow. This, therefore, gives me a uniform scale instrument.

In Fig. 3 is shown a modification of the invention which embodies the principles of the arrangement of Fig. 1 and has certain features in addition thereto. Referring to Fig. 3, 40 indicates a base containing a well 41, the upper end of which merges into a chamber 42 of greater diameter than well 41. In well 41 is a quantity of liquid, such as mercury, upon which rides a float B comprising a displacing piston 43 and a cup 44. Supported on base 40 is the upper portion 45 of the instrument casing, the top of which is closed by a cover plate 46 in which is an opening closed by a plug 47. Connected to casing portion 45 is a lug 48 to which is fastened a well 49 having a cover plate 50, and containing a quantity of liquid, such as mercury. Connecting cup 44 to well 49 is an inverted U-shaped tube 51, the ends of which extend down substantially to the bottoms of the cup and well. Tube 51 is filled with liquid of the same character as that in cup 44 and well 49. Tube 51 extends through a suitable opening in cover plate 50 and a packing indicated at 52 is provided in order to make a tight joint between cover 50 and the tube. In the case of both cup 44 and well 49 I preferably provide recesses 53 and 54 in their bottoms in which the ends of the legs of tube 51 terminate to seal them; and also to take care of over deflection in the case of well 49 so all the liquid will never be forced from well 49 to cup 44.

Connected to float B is a rod 55 on the upper end of which is a rack 56 which engages a pinion 57, carried on a shaft 58. Rack 56 is held in mesh with pinion 57 by a guide pulley 59. Shaft 58 is journaled in a frame 60 supported by a bracket 61 fastened to a wall of casing 45. On shaft 58 is a U-shaped magnet 62 which corresponds to magnet 23 of Fig. 1 and which serves to transmit motion to a mechanism which is shown as being the same as that of Fig. 1. Such mechanism has accordingly been indicated by reference numerals corresponding to those used in Fig. 1 except that the exponent $a$ has been added thereto, and further description of it is therefore unnecessary. As pointed out in connection with Fig. 1 the magnetic transmission and the indicating and recording mechanism illustrated are of well-known structure and are to be taken as typical of any suitable means for indicating or indicating and recording the movements of float B.

Connected to well 49 above the level of the liquid therein, preferably through cover 50, is the leading pressure pipe 63 and connected to casing 45 is the trailing pressure pipe 64. Pipes 63 and 64 connect to the leading and trailing point of a suitable pressure difference creating device such as that shown in Fig. 2, for example. With this arrangement, it will be seen, the liquid in well 49 is subjected to the leading pressure and the liquid in cup 44 to the trailing pressure.

From a consideration of the structure so far described, it will be evident that well 41, cup 44, well 49, and inverted U-tube 51 of Fig. 3 correspond respectively to well 6, cup 10, well 8 and U-tube 12 of Fig. 1; and that float B of Fig. 3 corresponds to float A of Fig. 1.

With the arrangement in Fig. 3, however, I provide a stationary plate 65 which is located inside cup 44 and is fixed to the lower end of the leg of U-tube 51 which terminates in cup 44. When the instrument is in the zero position, i. e., no flow, the levels of the liquids in cup 44 and well 49 are the same and they occupy substantially the positions shown in the drawing. Plate 65 is then adjacent to the bottom of well 44 and the liquid in the bottom of well 44 tends to rise slightly around it.

The areas of well 49 and cup 44 are such that the liquid level in cup 44 always remains the same during the operation of the meter so such level is always adjacent to fixed plate 65. If now a pressure difference, such as is set up by a pressure difference creating device, is applied to pipes 63 and 64, liquid will be forced from well 49 through U-tube 51 into the cup 44 after the manner already explained in connection with Fig. 1 and the weight of such liquid being added to float B will cause the same to lower. Should there be any lag in the movement of float B due to inertia of the moving parts or to their sticking then the liquid in cup 44 will build up around plate 65 to rise quickly a hydrostatic head thus producing an additional downward force which acts to lower float B. As a result a substantial force will be provided to insure the movement of float B. As will be clear, fixed plate 65 comes into play only in case the float tends to lag in its movement and it thus provides a supplementary moving means for float B.

As already stated, the relative areas of cup 44 and well 49 are such that for any given deflection the float B will lower by an amount sufficient to always maintain the level of liquid in cup 44 in substantially the same plane. That is to say float B lowers sufficiently relatively to well 49 that the total deflection will take place entirely in well 49. This gives a substantial movement to float B which of course lends accuracy to the instrument.

The modification shown in Fig. 3 may be arranged to give a uniform scale instrument in any of the ways pointed out in connection with Fig. 1. In the present instance, I have shown well 49 shaped to give the desired result.

It will also be obvious that if desired a fixed plate as shown at 65 in Fig. 3 may be used with the arrangement shown in Fig. 1 or that in the arrangement of Fig. 3 such fixed plate may be omitted.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a flow meter, a casing, a float well therein containing a liquid, a float which rides on the liquid and comprises a displacing portion and a cup, an annular chamber in the casing concentric with said float, a tube connecting said cup and chamber for transferring liquid from one to the other, and leading and trailing pipe connections for said chamber and cup.

2. In a flow meter, a casing, a float well therein containing a liquid, a float which rides on the liquid and comprises a displacing portion and a cup, an annular chamber in the casing concentric with said float, and an inverted U-tube the legs of which project into said cup and chamber.

3. In a flow meter, a casing, a float well therein containing a liquid, a float which rides on the liquid and comprises a displacing portion and a cup, an annular chamber in the casing concentric with said float, an inverted U-tube the legs of which project into said cup and chamber, and mechanism for indicating movements of said float.

4. In a flow meter, a casing, a float well therein containing a liquid, a float which rides on the liquid and comprises a displacing portion and a cup, a chamber adjacent said cup, a U-tube which connects such cup and chamber, a pipe for conveying a leading pressure to said chamber, a pipe for conveying a trailing pressure to said cup, and a fixed plate in said cup for coöperating with the liquid therein.

5. In a flow meter, a casing, a float well therein containing a liquid, a float which rides on the liquid and comprises a displacing portion and a cup, a chamber adjacent said cup, a U-tube which connects such cup and chamber for transferring liquid between them, a pipe for conveying a leading pressure to said chamber, a pipe for conveying a trailing pressure to said cup, the relative areas of such cup and chamber being such that the liquid level in the cup remains substantially constant, and a fixed plate in said cup which is located at the level of the liquid in the cup.

6. In a flow meter, a casing, a float well therein, containing a liquid, a float which rides on the liquid and comprises a displacing portion and a cup, a chamber adjacent said cup, a U-tube which connects such cup and chamber for transferring liquid from one to the other, a pipe for conveying a leading pressure to said chamber, a pipe for conveying a trailing pressure to said cup, the relative areas of such cup and chamber being such that the liquid level in the cup remains substantially constant, a fixed plate in said cup which is located at the level of the liquid in the cup, and means for indicating movements of said float.

In witness whereof I have hereunto set my hand this second day of October, 1919

JACOB W. McNAIRY.